United States Patent [19]

Misawa et al.

[11] Patent Number: 4,688,813
[45] Date of Patent: Aug. 25, 1987

[54] CARRIER FOR RESCUING PATIENTS

[75] Inventors: Rintaro Misawa, Tokyo; Kou Takahashi, Tokorozawa, both of Japan

[73] Assignee: Sunwa Sharyo Manufacturing Co., Ltd., Tokyo, Japan

[21] Appl. No.: 836,351

[22] Filed: Mar. 5, 1986

Related U.S. Application Data

[62] Division of Ser. No. 565,553, Dec. 27, 1983, Pat. No. 4,585,241.

[51] Int. Cl.$^4$ .............................................. B62B 5/02
[52] U.S. Cl. ..................... 280/5.22; 180/8.2; 180/8.7; 180/9.22; 180/907; 280/242 WC; 280/DIG. 10; 297/DIG. 4
[58] Field of Search ............ 280/5.2, 5.22, 5.24, 280/5.26, 242 WC, 289 WC, DIG. 10; 180/9.1, 9.21, 9.22, 907, 8.2, 8.7; 297/DIG. 4; 188/184, 185

[56] References Cited

U.S. PATENT DOCUMENTS

| | | | |
|---|---|---|---|
| 3,111,331 | 11/1963 | Locke | 280/5.22 |
| 3,276,531 | 10/1966 | Hale et al. | 280/5.22 X |
| 3,292,722 | 12/1966 | Bamberg | 280/5.22 X |
| 3,827,718 | 8/1974 | Curry | 280/5.2 X |
| 4,061,199 | 12/1977 | Last | 180/8.2 |

FOREIGN PATENT DOCUMENTS

| | | | |
|---|---|---|---|
| 72081/74 | 2/1976 | Australia | 180/8.2 |
| 57-95267 | 6/1982 | Japan | 280/5.22 |

Primary Examiner—John J. Love
Assistant Examiner—Charles R. Watts
Attorney, Agent, or Firm—Martin A. Farber

[57] ABSTRACT

A carrier for rescuing patients having a frame having a pair of lower horizontal portions and upwardly inclined portions adjacent to the horizontal portions at rear end portions thereof.

A pair of front and rear wheels are provided on the frame, and a pair of crawlers engaged with the frame and wheels to be moved on the frame and around the wheels.

A seat having a handle is provided on the frame. A brake such as a centrifugal brake is provided for slowing the rotation of either of said front and rear wheels and for keeping the rotation speed in a constant speed.

Travelling wheels are rotatably provided on the frame for moving the carrier on a flat surface.

3 Claims, 22 Drawing Figures

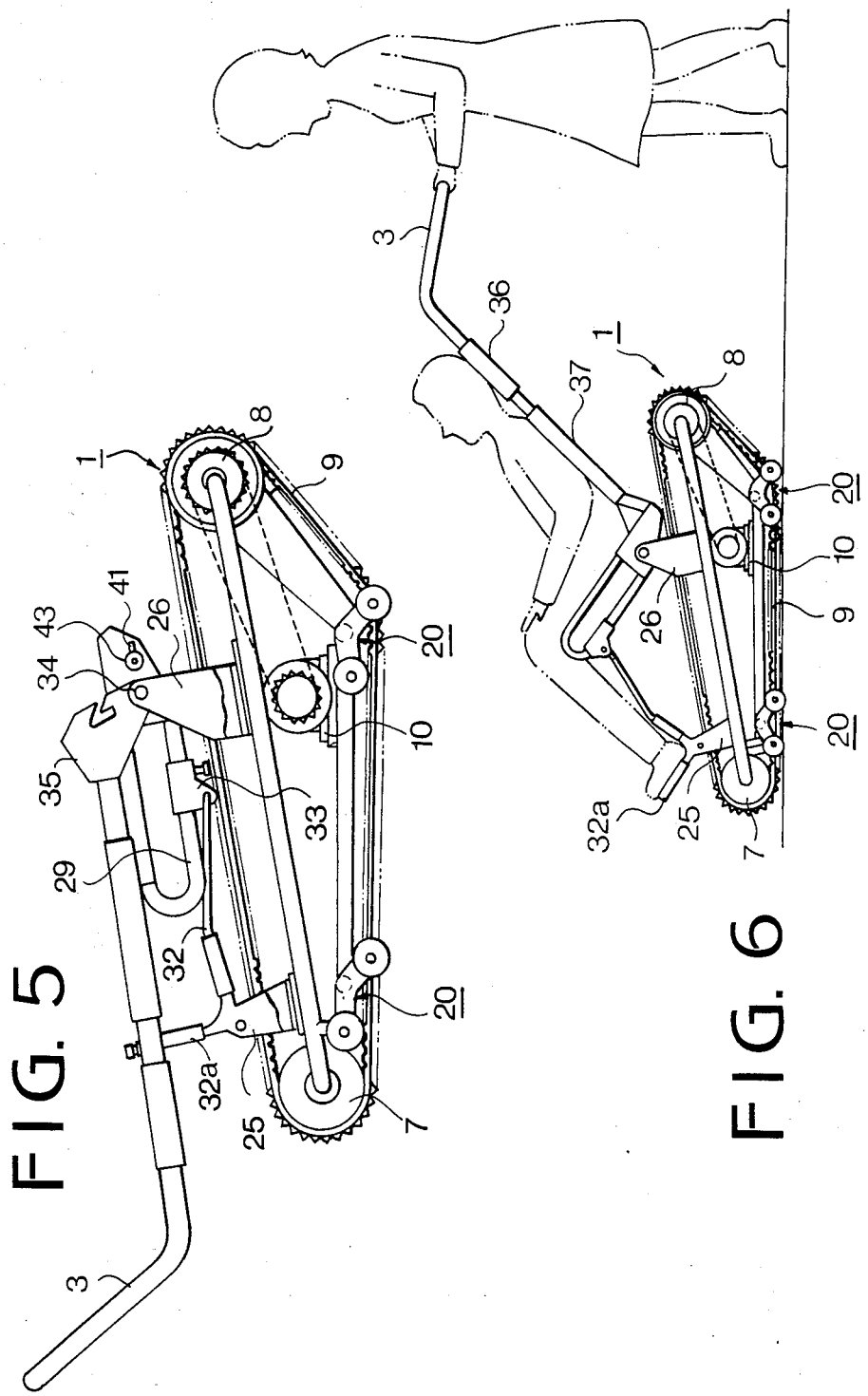

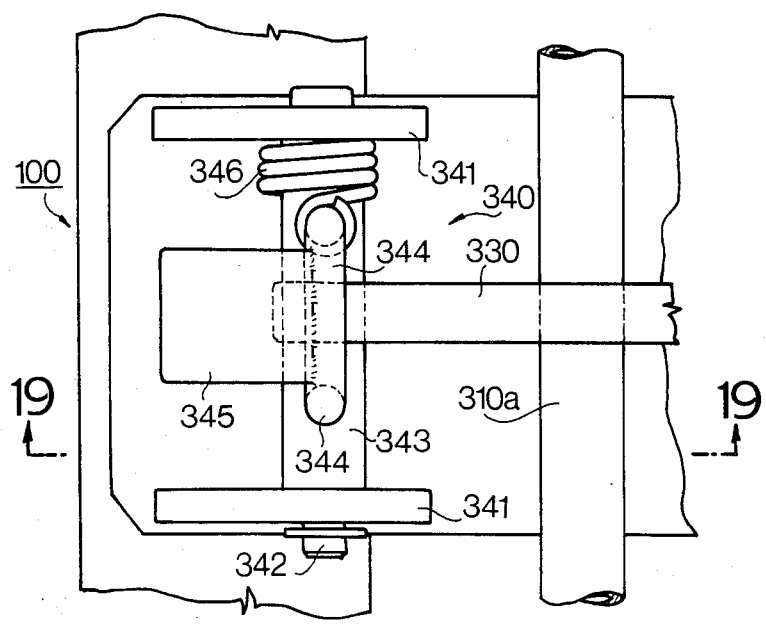
F I G. 18
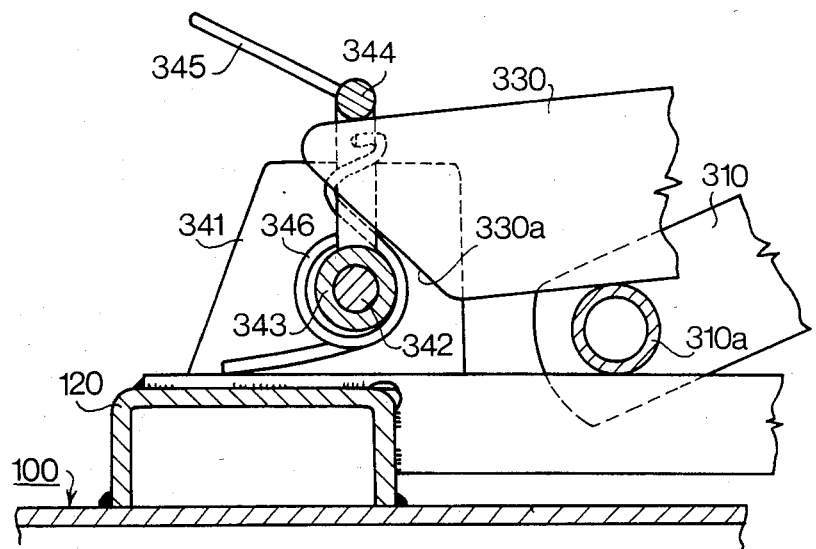
F I G. 19

CARRIER FOR RESCUING PATIENTS

This is a division of application Ser. No. 565,553 filed Dec. 27, 1983 (now U.S. Pat. No. 4,585,241 issued Apr. 29, 1986).

BACKGROUND OF THE INVENTION

The present invention relates to a carrier for rescuing patients, and more particularly to a carrier for carrying inpatients in high floors of an hospital building on stairs.

When a fire occurs in a high building, elevators can not be used for safety. Therefore, inpatients on high floors in a hospital building must be rescued by nurses and attendants thereof, descending stairs. It is difficult to quickly carry a plurality of inpatients by human power.

SUMMARY OF THE INVENTION

The object of the present invention is to provide a carrier by which patients can be easily carried, descending stairs.

According to the present invention, there is provided a carrier for rescuing patients comprising: a frame having a pair of lower horizontal portions and upwardly inclined portions adjacent to said horizontal portions at rear end portions thereof; a pair of front wheels provided on front portions of said frame; a pair of rear wheels provided or rear portions of said frame; a pair of crawlers engaged with said frame and wheels to be moved on the frame and around the wheels; a seat provided on said frame; a handle connected to said seat; brake means for slowing the rotation of either of said front and rear wheels; and a pair of travelling wheel mechanisms provided on both sides of said frame at said lower horizontal portions thereof for moving the carrier on a flat surface, each of said travelling wheel mechanisms comprising an inverted V-shaped lever rotatably mounted relative to said frame, front and rear travelling wheels mounted on both ends of said lever, respectively, and spring means for biasing the lever in a direction for raising the front travelling wheel higher than an underside level of the crawlers.

The other objects and features of this invention will be apparently understood from the following description with reference to the accompanying drawings.

BRIEF DESCRIPTION OF DRAWINGS

FIG. 5 is a side view showing a folded state of the carrier;

FIGS. 6 and 7 show carrying positions;

FIG. 18 is an enlarged plan view of FIG. 16;

FIG. 19 is a sectional view taken along the line 19—19 of FIG. 18;

DETAILED DESCRIPTION OF THE PREFERRED EMBODIMENTS

Figure 1:
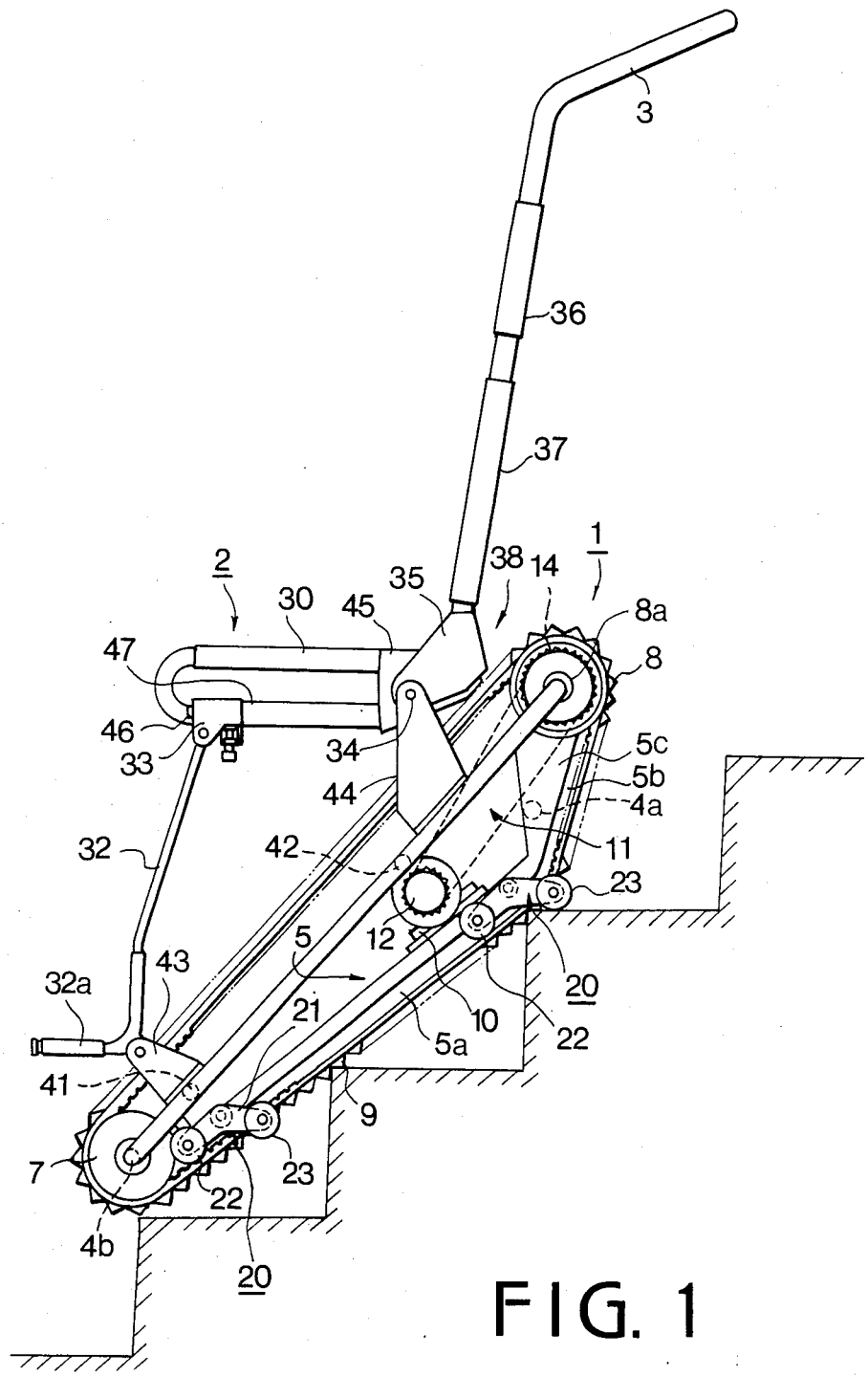
FIG. 1 is a side view showing a carrier according to the present invention.
Figure 2:
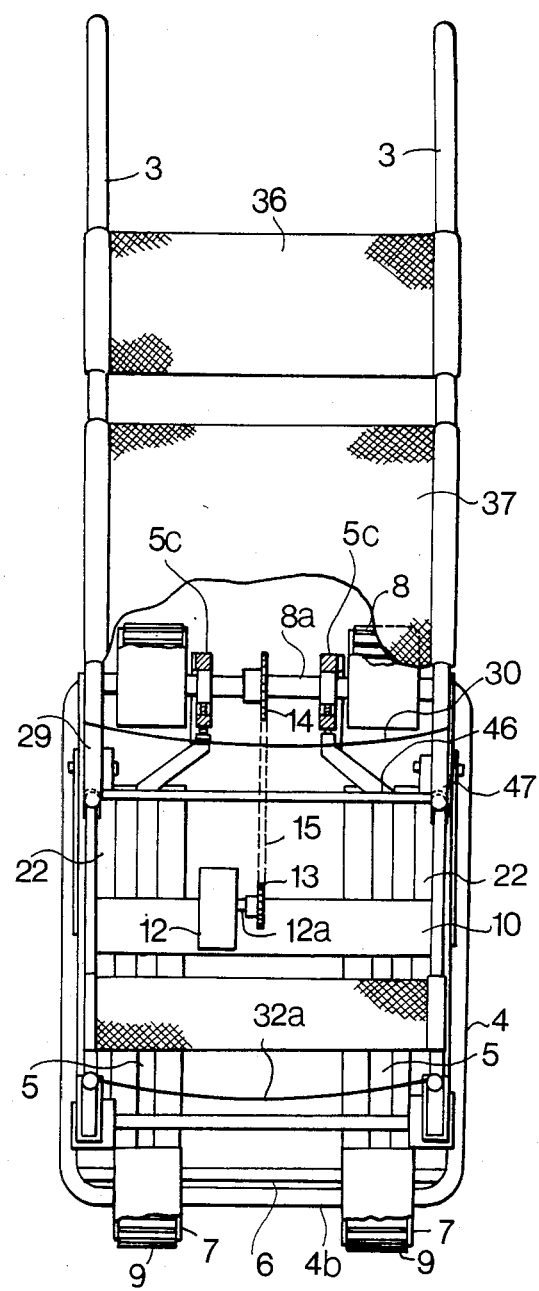
FIG. 2 is a front view of the carrier, a part of which is cut away.

In a carrier shown in FIGS. 1 and 2, the numeral 1 generally designates a crawler device, 2 a seat mounted on the crawler device, and 3 a pair of steering handles which also serve as a back frame for a backrest of the seat 2.

The crawler device 1 has a pipe frame 4 which is generally retangular in plan and a pair of crawler guide frames 5 which are disposed inside and beneath the pipe frame 4. Each crawler guide frame 5 is connected to the pipe frame 4 at a front end thereof through a connecting pipe 6. Further, each crawler guide 5 has a horizontal portion 5a and a rear frame portion 5b which is bent at a predetermined portion at a connecting point to a rear cross member 4a of the pipe frame 4 and inclined upwardly. Such a supporting body containing the pipe frame 4 and the crawler guide frames 5 rotatably supports a pair of front idling wheels 7 and a pair of toothed pulleys 8 which engage with rubber crawlers 9. That is, the front pair of idling wheels 7 are rotatably mounted on a front cross member 4b of the pipe frame 4, and the pair of toothed pulleys 8 are rotatably supported by the ends of the crawler guide frame 5 through an axle 8a, and therefor, a supporting portion 5c of the crawler guide frame 5 is disposed in a position just inside of the inclined guide portion 5b. A pair of rubber crawlers 9 are wound over respective idling front wheels 7 and toothed pulleys 8, and are guided in grooves formed in the underside of the horizontal guide portions 5a and inclined guide portions 5b.

The above-mentioned axle 8a is slidably engaged with an elongated aperture formed in the supporting portion 5c of the crawler guide frame 5 and secured at a proper position so as to give a proper tension to the rubber crawler 9 through the toothed pulleys 8. The construction is substantially the same as the construction of conventional crawler mechanisms.

The length of the rubber crawler 9 is determined to have such a length that the part of crawler 9 which is guided by the horizontal guide portion 5a of the crawler guide frame 5 is longer than the length of the span over three edges of stair steps as shown in FIG. 1. By this way, crawlers 9 run on the stairway smoothly.

Mounted on the supporting plate 10 bridging over the pair of crawler guide frame 5 is a centrifugal brake 12 which has a shaft 12a. Sprockets 13 and 14 secured on the shaft 12a and the axle 8a, respectively and a chain 15 wound over these sprockets 13, 14 constitute a speed regulating device 11 which operates to keep the descending speed of the carrier at a constant speed.

Figure 3:
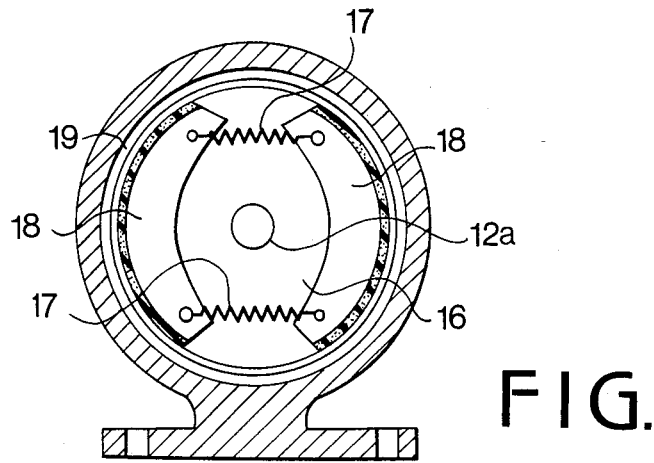
FIG. 3 is a sectional view of a centrifugal brake.

The speed regulating device 11, as shown in FIG. 3, has a rotary disc 16 housed in a case. In this case, the rotary disc 16 is connected to the shaft 12a, and has a pair of arcuate brake shoes 18, 18 which are disposed on both sides of the shaft 12a, and are pivotally mounted at an end thereof on pins secured to the rotary disc 16. Thus, when the speed of the rotary disc 16 reaches a predetermined value, the brake shoes 18 start to rotate outwardly against the force of a spring 17 to regulate the speed of crawler 9 by friction with a brake drum 19.

The crawler device 1 is provided with a pair of travelling wheel mechanisms 20 at both sides so as to travel smoothly on planar surfaces such as landings of stairs or on corridors.

Figure 9:
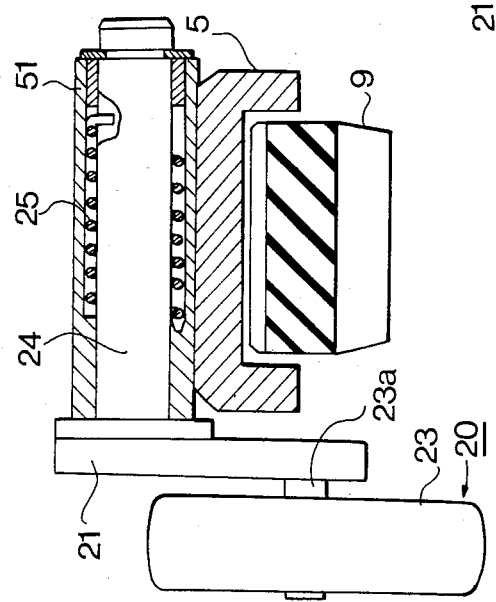
FIG. 9 is a sectional view taken along the line 9—9 of FIG. 8.
Figure 8:
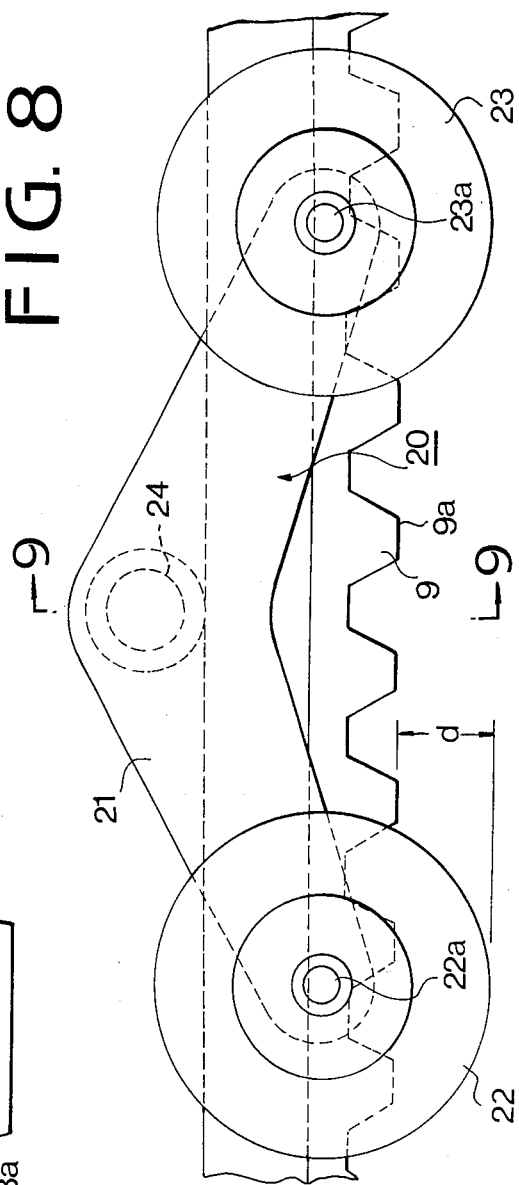
FIG. 8 shows a travelling wheel mechanism.

As shown in FIG. 8, each travelling wheel mechanism 20 comprises an inverted V-shaped crank or lever 21 on both ends of which are provided travelling wheels 22 and 23 on shafts 22a and 23a, respectively. The crank 21 has a shaft 24 at a central portion which is rotatably provided in a bearing 51 secured to guide 5 as shown in FIG. 9. Because a return spring 25 engages with the shaft 24 at one end and with the bearing at another end to give a small rotary torque to the lever 21, the front end of the lever 21 is kept raised.

As shown in FIG. 8, the grounding face of each wheel 22 (23) is at a lever lower than the grounding face 9a of the rubber crawler 9 by d. Therefore, while travelling on a planar surface, the grounding face 9a of the rubber crawler 9 is raised from ground by d (d≈10 mm).

The seat 2 is supported on the pipe frame 4 of the crawler device 1 which is reinforced by reinforce members 41, 42 bridged over the pipe frame 4 and secured thereto at opposite ends at which vertical brackets 43, 44 are provided. The seat 2 comprises a pair of U-shaped pipe frames 47 which are connected by a shaft 34 with each other and reinforced by a reinforce member 46. The seat is comprised of a canvas sheet 30 over the pair of pipe frames 47. A pair of chair front legs 32 are provided and a lower end of each leg is bent. A canvas sheet is also spread over the bent lower ends of the legs to form foot rest 32a. The upper end of each leg 32 is pivoted to a slide bracket 33 which is slidable along the pipe frame 47. Each bent portion of the chair leg is pivotally secured to the above mentioned bracket 43 to be movable in the backward and forward direction. Further brackets 45 of the seat 2 are pivotally connected to the brackets 44 by a shaft 34, on which a lower end of each steering handle 3 is pivotally mounted through a bracket 35. A canvas sheet is spread across the upper parts of the steering handles 3, which makes a head rest 36 of the chair, and another canvas sheet is also spread across the lower half of the steering handles 3, which makes a back rest 37 of the chair. The steering handles 3 are held upright at a proper position by a function of engaging means 38 which is provided between the bracket 35 and the bracket 45.

Figure 4:
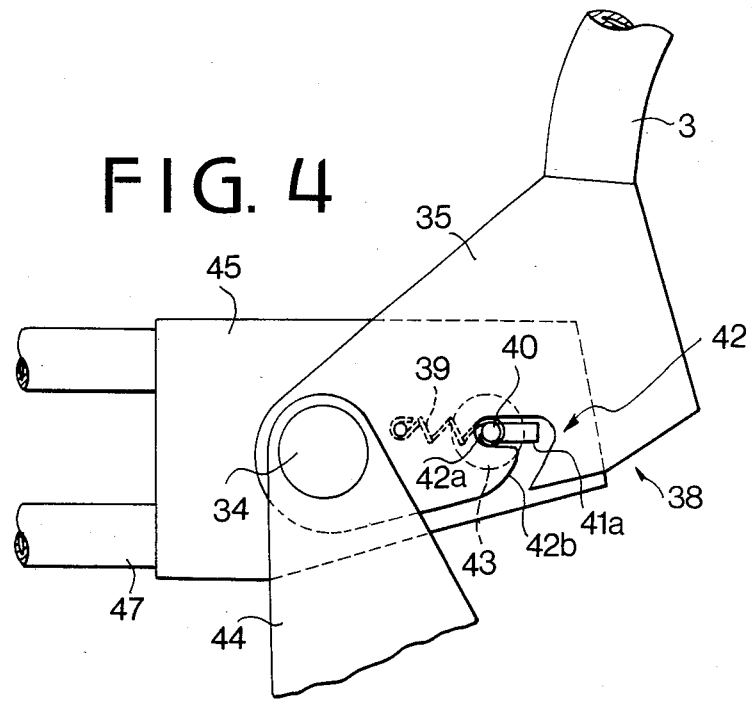
FIG. 4 is an enlarged view showing a part of FIG. 1.

In this embodiment, the engaging means 38 comprises, as shown in FIG. 4, the pivot 34 supporting the bracket 45. Each bracket 45 has a elongated guide holes 41a in which an engage pin 40 is slidably engaged. The pin 40 is urged to the shaft 34 by a spring 39 and has a pair of knobs 43 at both ends thereof. The bracket 35 has V-shaped holes 42 comprising an engaging portion 42a corresponding to the hole 41a and an opening 42b.

An engaging means is provided also between the afore-mentioned sliding bracket 33 and said pipe frame 47 to lock the sliding bracket 33 to the frame 47.

When the carrier is not used, the steering handles 3 pivotally mounted on the pipe frame 4, seat 2, and legs 32 can be folded. In particular, in the system assembled shown in FIG. 1, the brackets 33 are released from the frame 47, so that seat 2 and legs 32 can be folded as shown in FIG. 5, sliding the brackets 33 on the frame 47. Then, pins 40 are moved to the right in FIG. 4 against the spring 39, so that handles 3 can be rotated in the counter-clockwise direction, passing the pin 40 through opening 42b as shown in FIG. 5.

When the carrier is assembled for using, firstly the steering handles 3 are raised in the reverse order of the above described manner to hold the steering handle 3 in an upright position. Then, the seat 2 comes in a position making a predetermined angle to the crawler device 1 so that seat 2 itself becomes horizontal as shown in FIG. 1. In this position, the slide bracket 33 and the supporting pipe frame 47 are secured with each other.

Figure 7:
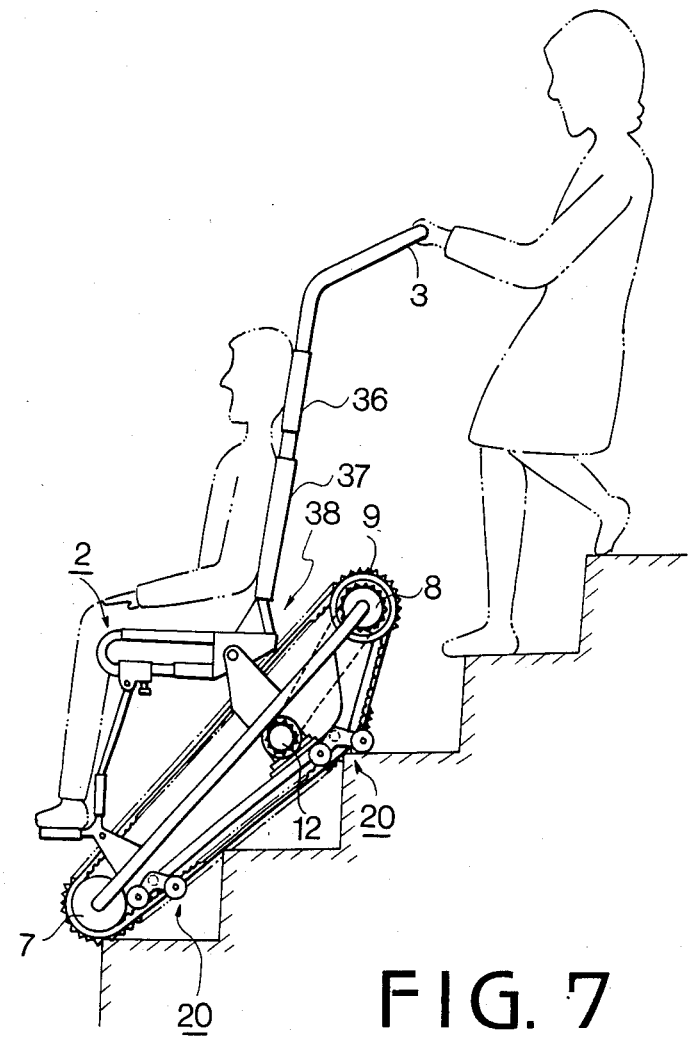

In rescuing of an inpatient, travelling wheels 22, 23 roll on the floor as shown in FIG. 6, and the carrier can be easily moved. When descending stairs as shown in FIG. 7, crawlers 9 move on the guide frames 5, rotating idler wheels 7 and toothed pulleys 8. Since the pulleys 8 are connected to the centrifugal brake 12, the speed of the carrier is kept below a predetermined safe speed. That is, when the speed exceeds the predetermined speed, the brake operates by the centrifugal force to regulate the speed. Thus, the carrier can be easily and safely lowered by a little human power.

During the lowering of the carrier, the wheel 22 on the lever 21 of each travelling wheel mechanism 20 is at a higher position than the crawler 9 by the spring 25 in the space between steps as shown in FIG. 1. Accordingly, the wheel 22 does not engage with the steps. When the rear wheel 23 engages with the step, the lever 21 rotates in the counter-clockwise direction against the spring 25. Thus, the travelling wheels pass the steps without causing stumbling of the carrier.

In order to turn the carrier on the floor, the carrier is rearwardly inclined by the handles 3 and can be turned about the rear wheels 23.

Figure 10:
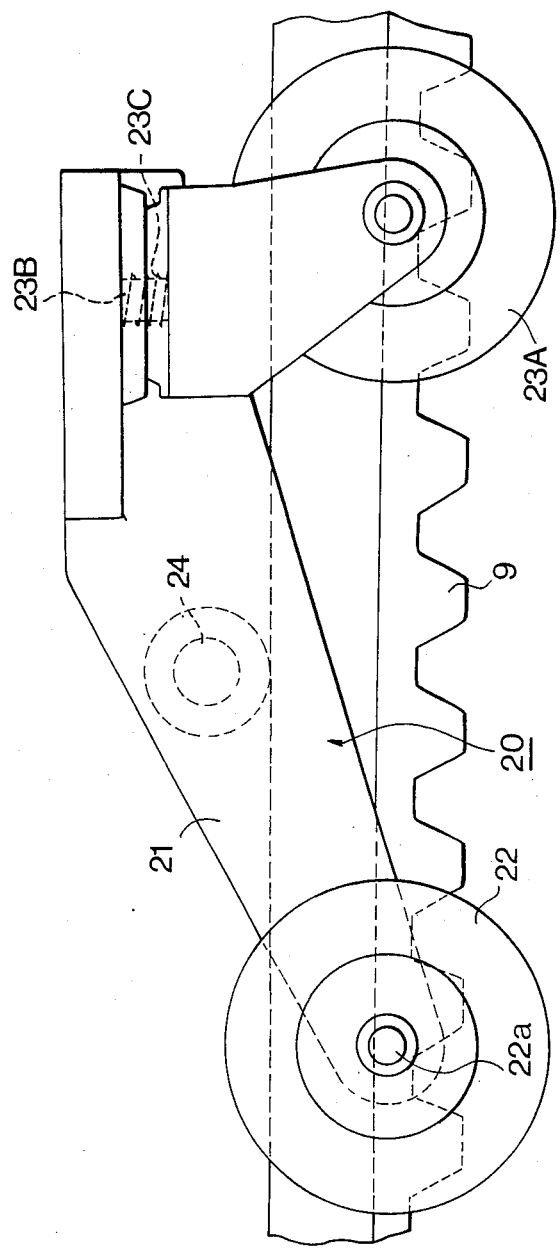
FIG. 10 shows another example of the travelling wheel mechanism.
Figure 11:
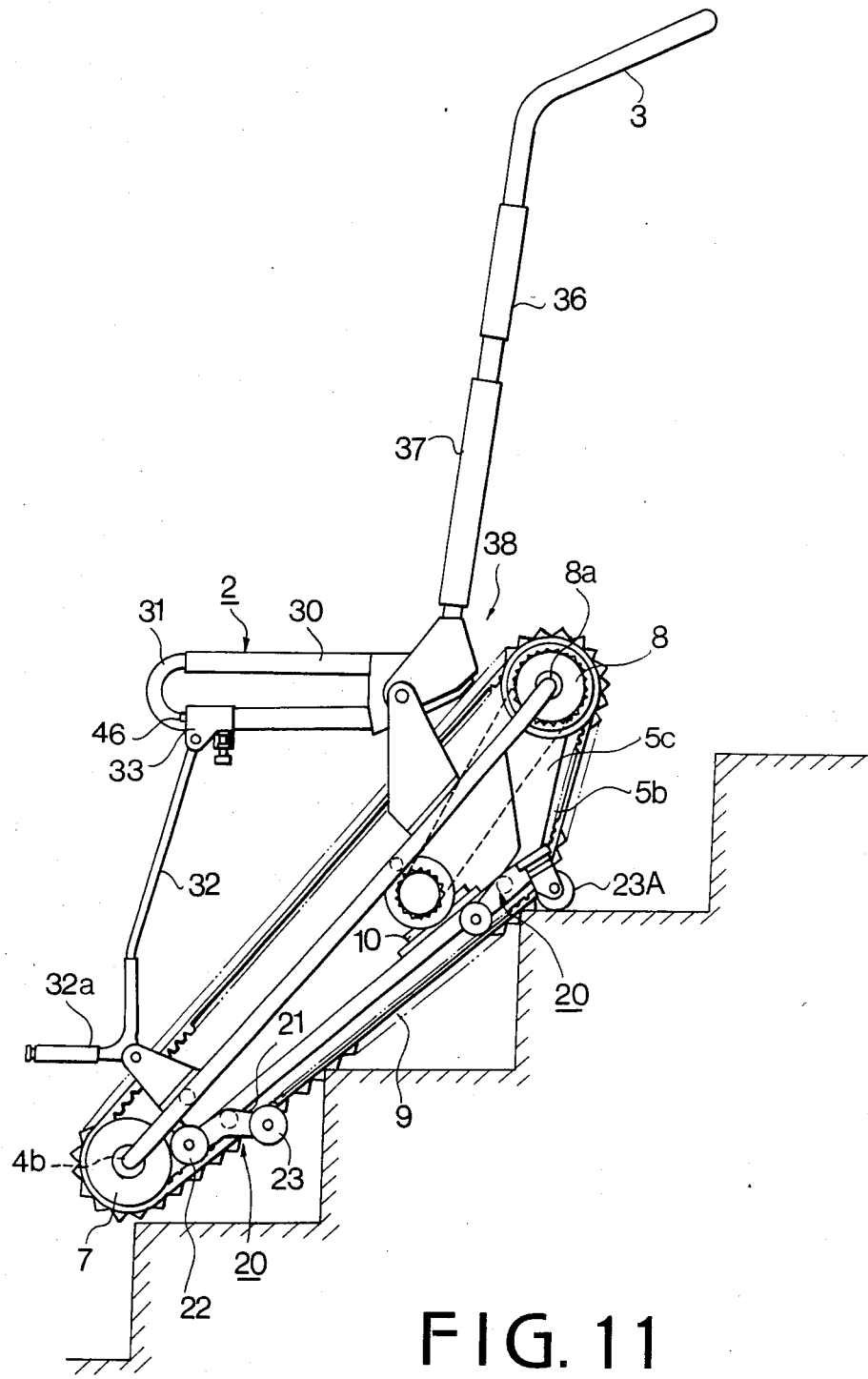
FIG. 11 is a side view showing a carrier employed with the travelling wheel mechanism of FIG. 10.

In order to simplify the turning of the carrier, the embodiment of FIGS. 10 and 11 is provided with casters 23A for wheels 23. In the embodiment, a spring 23c is provided around a shaft 23B of the caster so as to orient the caster in the rearward direction, in order to ensure a smooth descending of the carrier.

Although the centrifugal brake is provided in illustrated embodiment, another type of brake device for maintaining the descending speed of the carrier below a predetermined speed can be employed. For example a hydraulically operated brake in which hydraulic pressure varies with the increase of the speed to increase braking effect, or an electromagnetically operated brake can be used.

Figure 12:
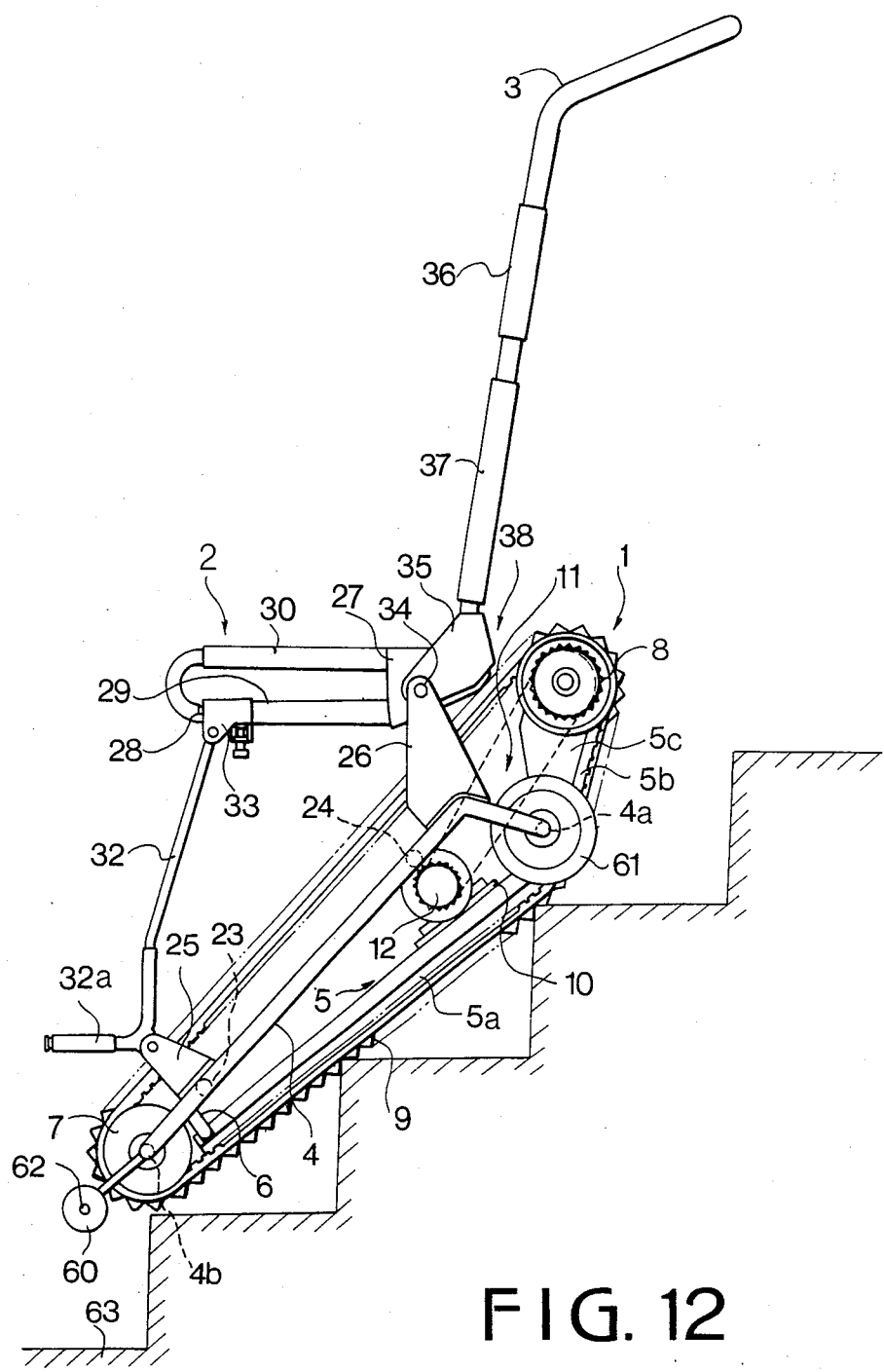
FIG. 12 is a side view showing a further embodiment of the present invention.
Figure 13:
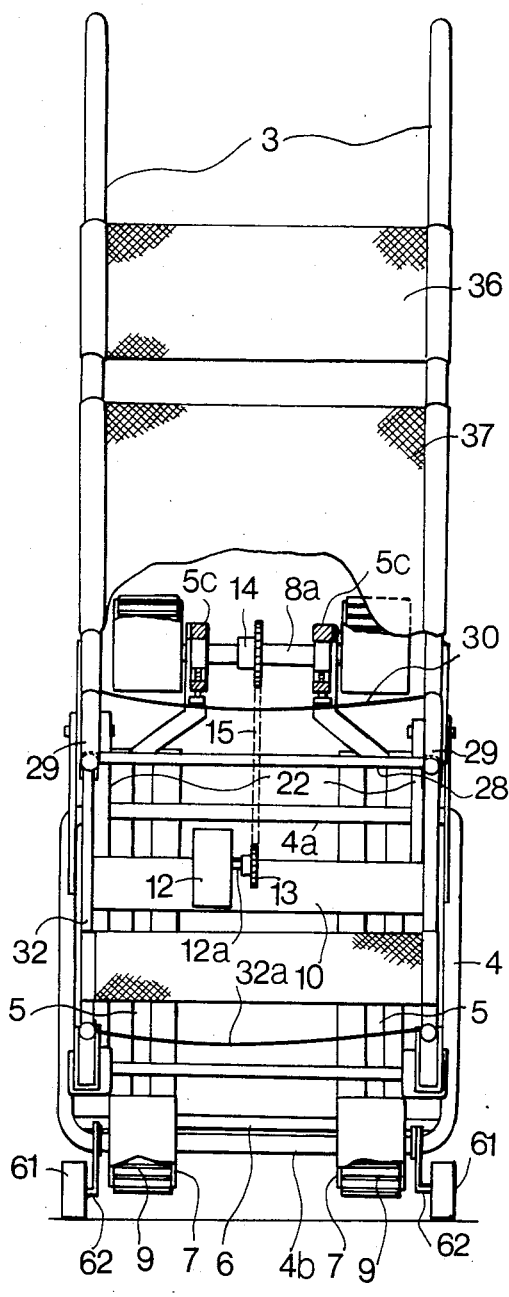
FIG. 13 is a front view of the carrier of FIG. 12.
Figure 14:
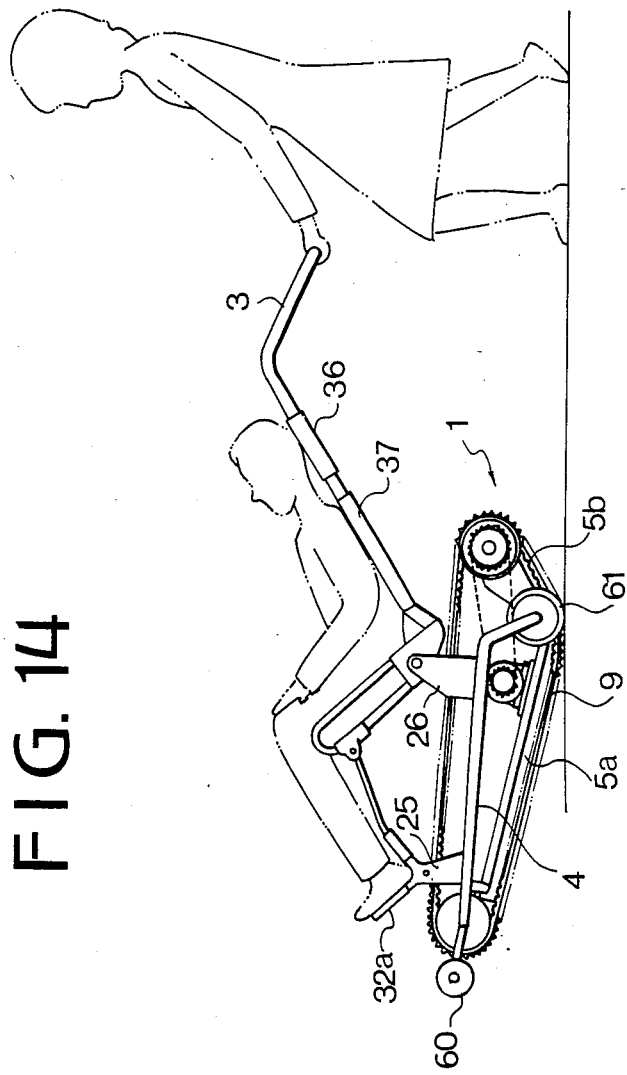
FIG. 14 is a side view showing a travelling condition on a flat surface.

Referring to FIGS. 12 to 14 showing another embodiment of the present invention, the carrier is provided with a pair of guide wheels 60 at front portions and a pair of rear wheels 61 at rear portions. Each guide wheel 60 is rotatably supported on a shaft 62 secured to the front cross member 4b to project from the front end of the carrier and rear wheel 61 is rotatably supported on the rear cross member 4a so as to project rearwardly a part of the periphery of the wheel from the inclined portion of the crawler 9. Each wheel is so positioned that the periphery of each wheel does not engage with steps during the descending. Other parts are similar to corresponding parts of the first embodiment and identified by the same reference numerals.

In travelling on the floor, as shown in FIG. 14, the carrier is rearwardly inclined and moved with rear wheels 61. When descending, the guide wheels 60 engage with a landing 63 at lowermost position of a stair, so that the carrier can be smoothly moved from the stair to the landing.

Figure 15:
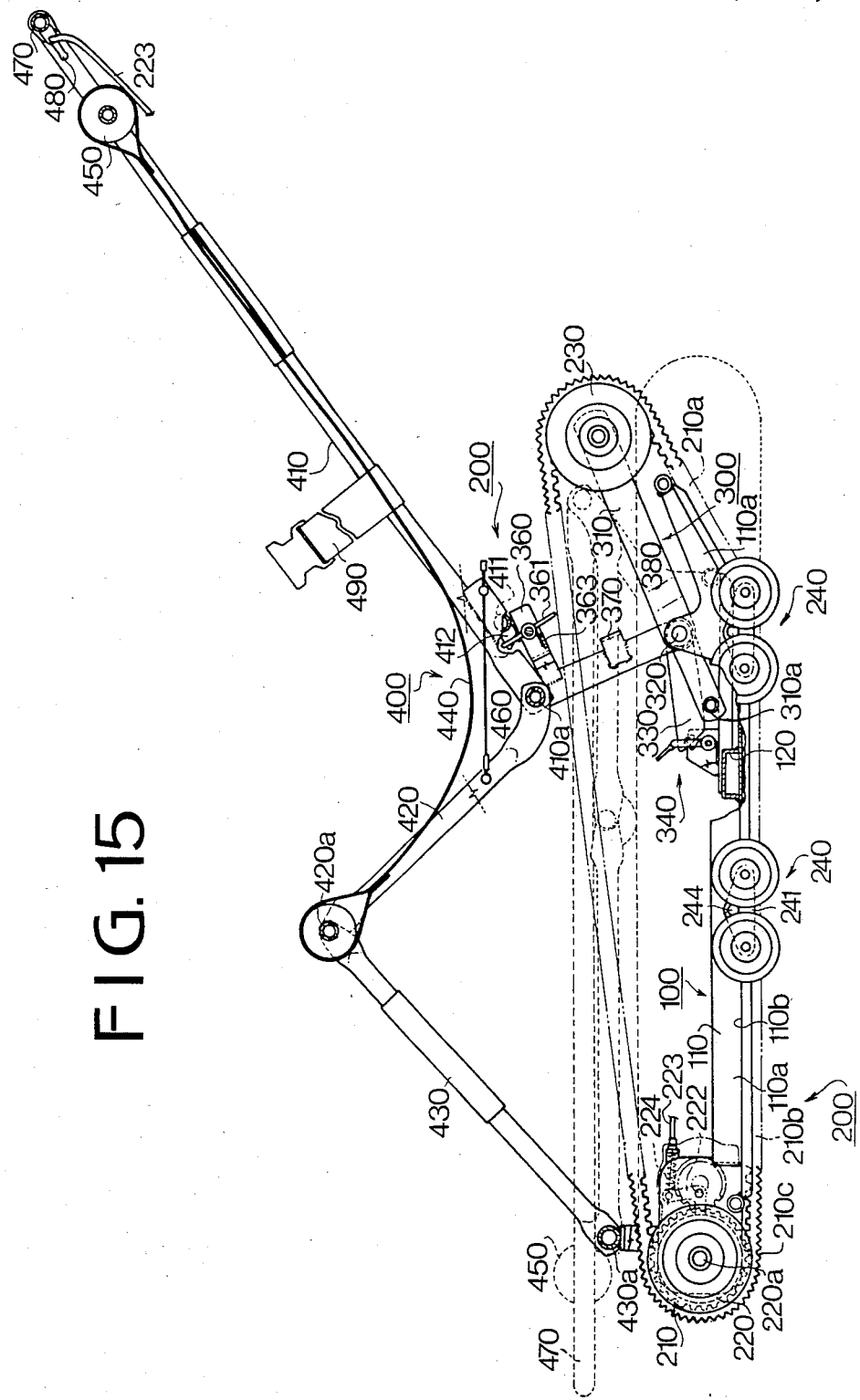
FIG. 15 is a side view of another embodiment of the present invention.
Figure 16:
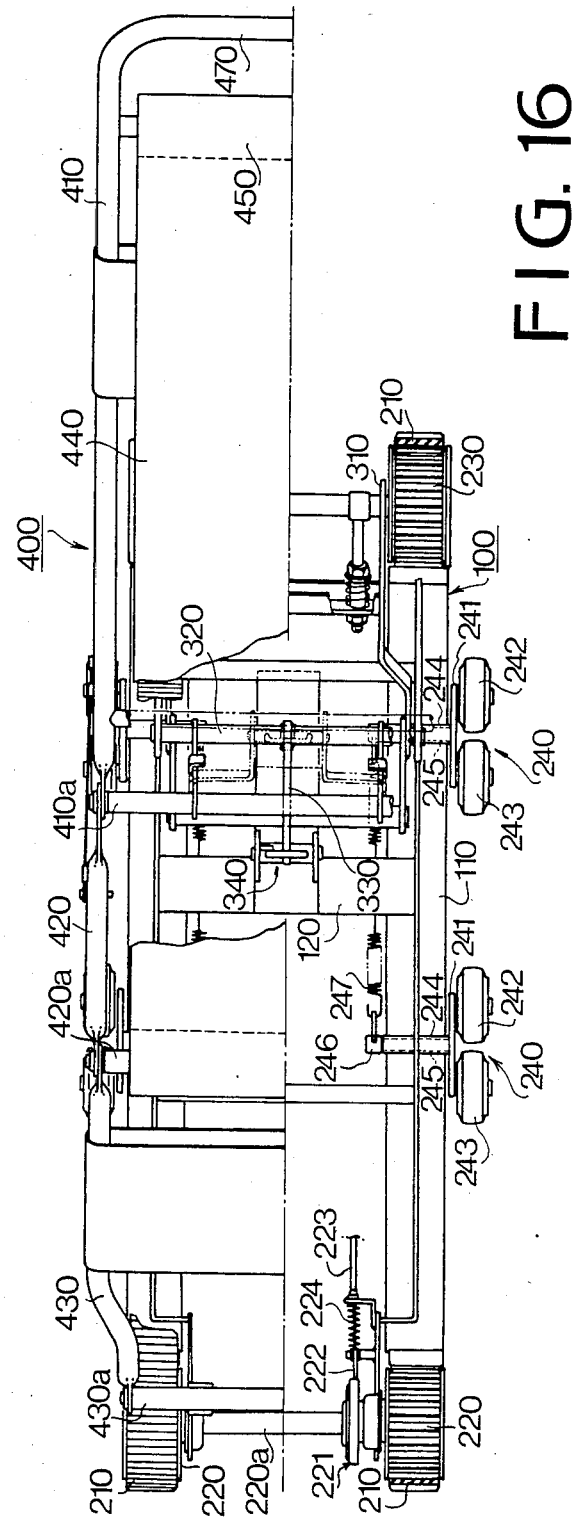
FIG. 16 is a plan view of the carrier of FIG. 15, a part of which is cut away.

Referring to FIGS. 15 and 16 showing another embodiment of the present invention, the carrier comprises a crawler device 200, an idler supporting device 300 and a seat 400. A frame 100 for the carrier comprises a pair of side frames 110 each having an inclined portion 110a and horizontal portion 110b. Between side frames 110, a lateral frame 120 are bridged. The crawler device 200 has a pair of crawlers 210 engaged with front wheels 220, idler wheels 230 and side frames 110. The side frames 110 support travelling wheels 240. A shaft 245 secured to a lever 241 of each travelling wheel 240 is rotatably supported in a pipe 244 secured to the side frame. The shaft 245 has a lever 246 (FIG. 22) which is urged by a spring 247 to raise a front wheel 243.

As shown in FIG. 16, a brake drum 221 is secured to a shaft 220a of the front wheels 220. The brake drum 221 is provided with brake shoes which are operating by a lever 222 engaged with a wire 223 through a spring 224.

The idler wheels 230 are rotatably supported on a shaft slidably engaged with a pair of supporting arms 310 which are supported on a shaft 320 rotatably supported by side frames 110a.

A holding arm 330 having an inclined end portion 330a (FIG. 17) is secured to the shaft 320. Referring to FIGS. 18 and 19, a holding device 340 comprises a shaft 342 secured to brackets 341 secured to the lateral frame 120, a pipe 343 rotatably mounted on the shaft 342, a hook 344 secured to the pipe 343, a handle 345 secured to the hook 344, and a spring 346 urging the hook 344 to an upright position. The hook 344 engages with the holding arm 330 to hold it in an operating position.

Figure 17:
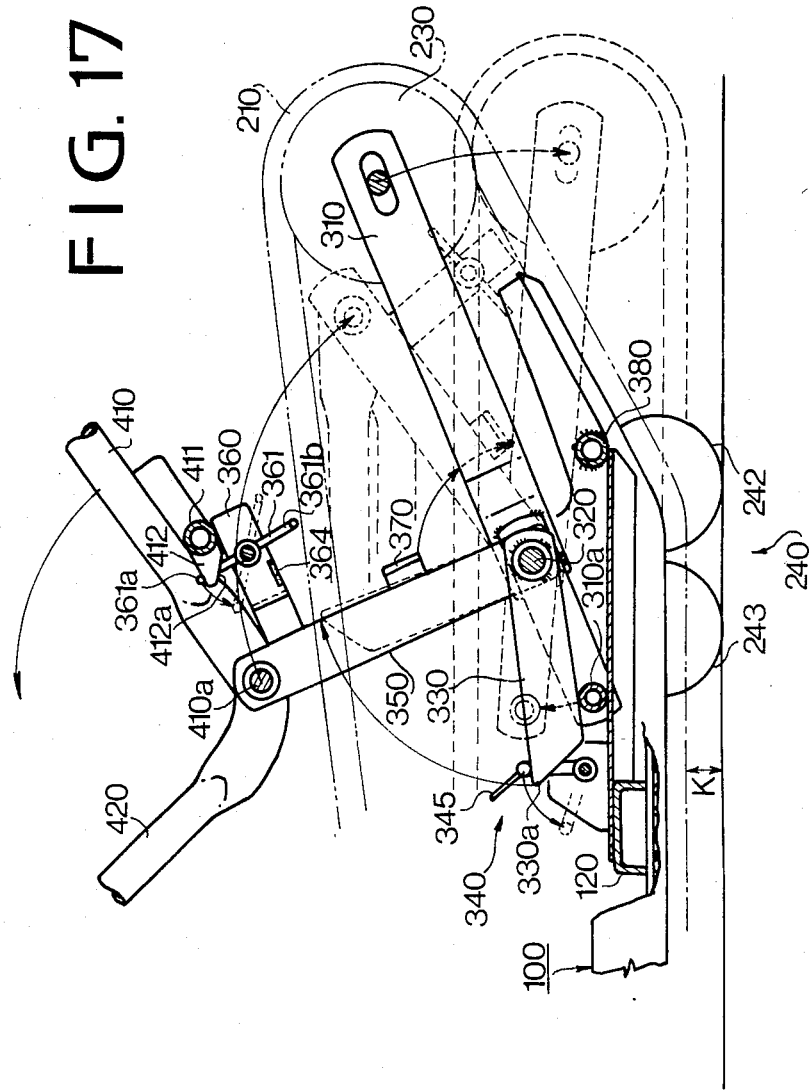
FIG. 17 is a sectional side view of a part of FIG. 15.
Figure 20:
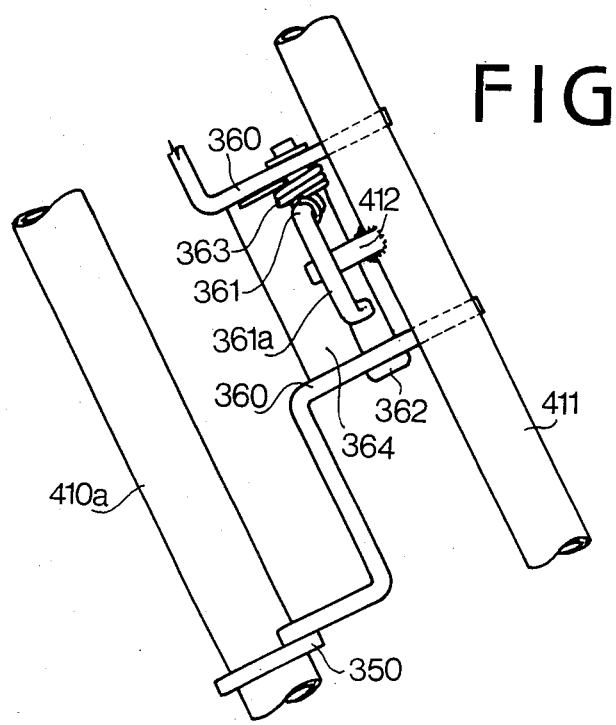
FIG. 20 is an enlarged plan view of a part of FIG. 16.
Figure 21:
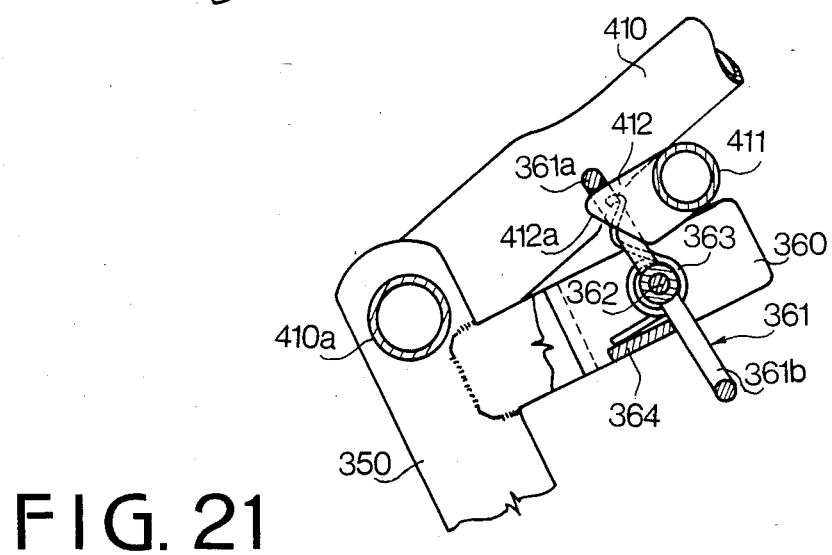
FIG. 21 is a sectional view of the part of FIG. 20.

Referring to FIGS. 17, 20 and 21, a supporting arm 350 for supporting the chair 400 is secured to the shaft 320. The arm 350 has an engaging frame 360 on which a hook 361 having a window frame shape is rotatably supported by a shaft 362 and biased by a spring 363 in the clockwise direction in FIG. 21, to engage with a stopper 364. The arm 350 has an engaging member 370 which engages with the arms 310.

A backrest frame 410 of the chair 400 is rotatably mounted on a shaft 410a secured to the arm 350 and has a lateral pipe 411 engaged with the frame 360. An engaging member 412 having an inclined end 412a is secured to the pipe 411 and engages with hook 361. A chair frame 420 is rotatably mounted on the shaft 410a and a leg frame 430 is rotatably connected to the chair frame 420 by a shaft 420a and to the frame 100 by a shaft 430a. A canvas 440 is attached to the frame 410 and 420 and a headrest 450 is provided on a top portion of the backrest frame 410. A pair of wires 460 are connected between both frames 410 and 420 to restrict the relative rotation of both frames.

A handle 470 is formed on the top of the frame 410 and a brake lever 480 is rotatably mounted on the handle 470. The lever 480 is connected to shoe in the brake drum 221 by a wire 223 to operate the brake. On the frame 410, a safety belt 490 is provided.

Figure 22:
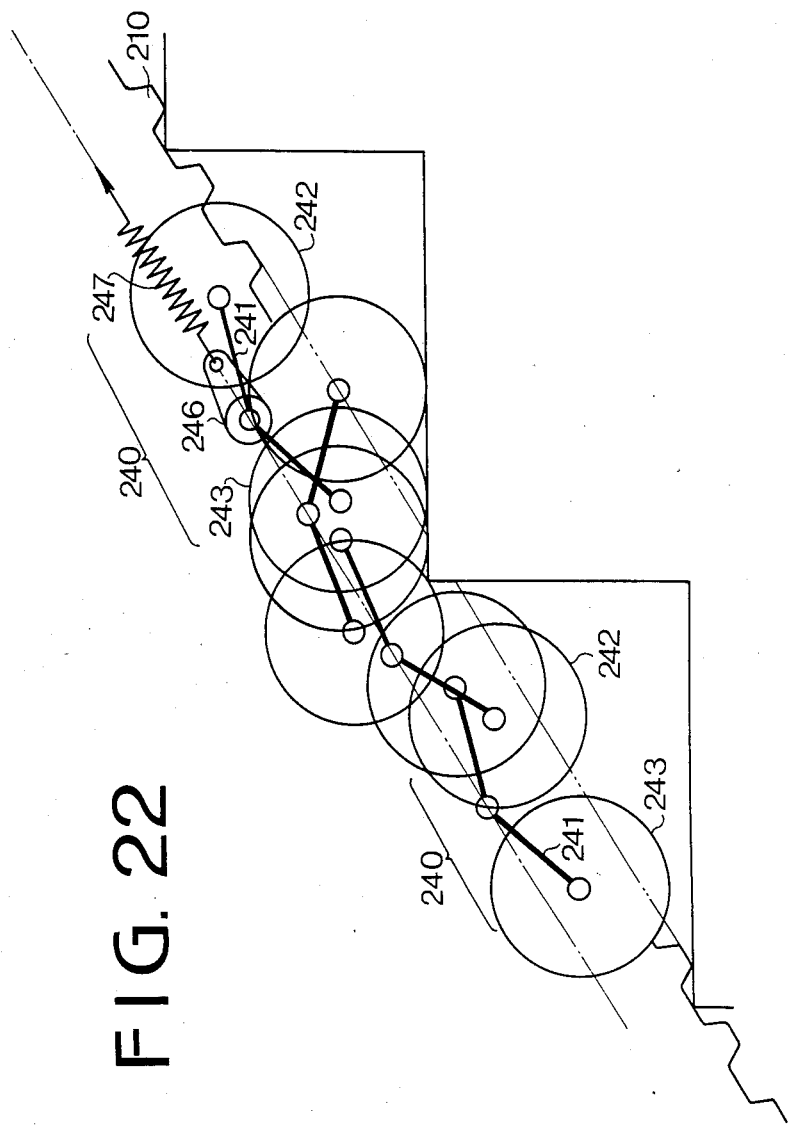
FIG. 22 is a schematic view showing operation of travelling wheels.

Operation for carrying an inpatient is the same as the previous embodiments. Upon descending of the carrier on stairs, the brake lever 480 is operated to limit the descending speed. FIG. 22 shows operation of travelling wheels on steps in detail.

Describing holding method of the carrier, first the handle 345 is rotated in the counter clockwise direction (FIG. 17) against the spring 346 to disengage the hook 344 from the arm 330. Then, the hook 361 is rotated in the counter clockwise direction to release the engaging member 412 thereby to free the backrest frame 410. Thereafter, the frame 410 is rotated in the counter clockwise direction in FIG. 15 with rotation of arm 350 in the clockwise direction about shaft 320 and with rotations of frames 420 and 430. Thus, frames are flattened as shown in FIG. 15 with dashed lines. Further, engaging member 370 engages with supporting arms 310 to rotate them in the clockwise direction about the shaft 320 to a stopper 380. Thus, idler wheels 230 is lowered to the horizontal position as shown in FIG. 15 by dotted line, so that the carrier is entirely flattened.

In order to raise frames and idler wheels to the operating positions, the frame 410 is rotated in the clockwise direction, so that the arm 350 is raised with elevating wheels 230 and frames 420 and 430. Then hooks 344 and 361 are engaged with arm 330 frame 360, respectively, so as to lock frames and arms.

While the presently preferred embodiments of the present invention have been shown and described, it is to be understood that this disclosure is for the purpose of illustration and that various charges and modifications may be made without departing from the spirit and scope of the invention as set forth in the appended claims.

What is claimed is:

1. A carrier for rescuing patients comprising:
a frame having a pair of lower horizontal portions and upwardly inclined portions adjacent to said horizontal portions at rear end portions thereof;
a pair of front wheels provided on front portions of said frame;
a pair of rear wheels provided on rear portions of said frame;
a pair of crawlers is engaged with said frame and said wheels so as to be moved on the frame and around the wheels;
a seat provided on said frame;
a handle connected to said seat;
brake means for slowing the rotation of either of said front and rear wheels;
front and rear travelling wheels rotatably provided on said frame for moving the carrier on a flat surface;
spring means for raising the front travelling wheel higher than an underside level of the crawlers;
said rear travelling wheel comprises a caster,
a bearing mounted to said frame;
a lever;
said front and rear travelling wheels are mounted on respective ends of said lever;
a shaft rotatably mounting said lever relative to said frame by said shaft being connected to said lever and rotatably disposed in said bearing; and
said spring means is a torsion spring engaged in said bearing and engages against said shaft so as to rotate said shaft.

2. The carrier according to claim 1, wherein said front and rear travelling wheels are mounted on said lever so as to be freely rotatable.

3. The carrier according to claim 1, wherein one of each of said lever, shaft, bearing, spring means and front and rear travelling wheels is included on each lateral side of said frame.

* * * * *